US005103201A

United States Patent [19]

Schmeller

[11] Patent Number: 5,103,201

[45] Date of Patent: Apr. 7, 1992

[54] SWITCHING MODE POWER TRANSFORMER

[75] Inventor: Anton Schmeller, Erlau b. Passau, Fed. Rep. of Germany

[73] Assignee: Vogt Electronic Aktiengesellschaft, Erlav bei Passau, Fed. Rep. of Germany

[21] Appl. No.: 328,572

[22] Filed: Mar. 27, 1989

[30] Foreign Application Priority Data

Mar. 29, 1988 [DE] Fed. Rep. of Germany ....... 3810625

[51] Int. Cl.[5] .............................................. H01G 17/06

[52] U.S. Cl. .................................... 336/178; 336/110

[58] Field of Search ............... 336/178, 165, 134, 135, 336/110, 212

[56] References Cited

U.S. PATENT DOCUMENTS

| | | | |
|---|---|---|---|
| 889,346 | 6/1908 | Thomassan | 336/178 X |
| 1,367,988 | 2/1921 | Replogle | 336/178 X |
| 2,555,110 | 5/1951 | Bobb | 336/178 X |
| 2,585,932 | 2/1952 | Hane | 336/178 X |
| 2,587,097 | 2/1952 | Berlant | 336/178 X |
| 2,867,785 | 1/1959 | Crumbliss | 336/178 |
| 3,243,692 | 3/1966 | Heissmeier et al. | 336/134 X |

FOREIGN PATENT DOCUMENTS

| | | | |
|---|---|---|---|
| 1159725 | 7/1958 | France | 336/165 |
| 52-32923 | 7/1977 | Japan | 336/212 |

*Primary Examiner*—Thomas J. Kozma
*Attorney, Agent, or Firm*—Fiddler & Levine

[57] ABSTRACT

A switching mode power transformer for operation as feedback converter has a core which is made in only one piece and which does not require any particular finishing operations. The core has a center core part with windings thereon and outer core parts which are chamfered on their mutually remote sides to form outer surfaces which converge towards each other.

3 Claims, 3 Drawing Sheets

Figure 7:
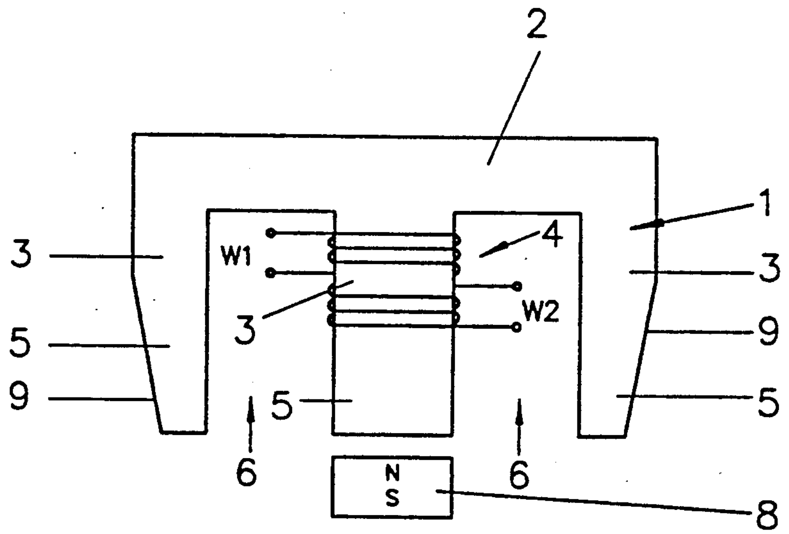

Fig. 1a
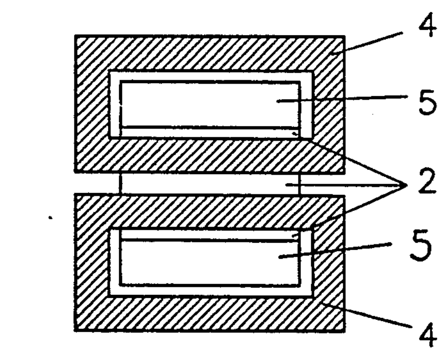
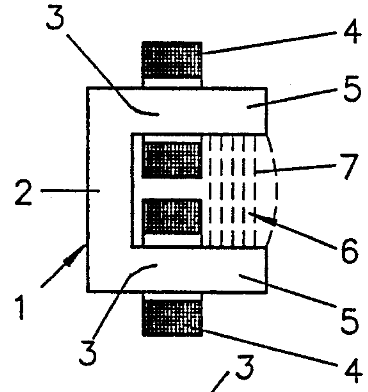
Fig. 1
Fig. 2a
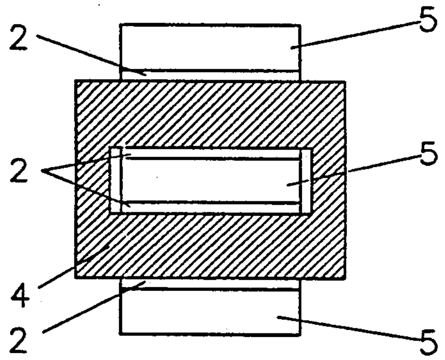
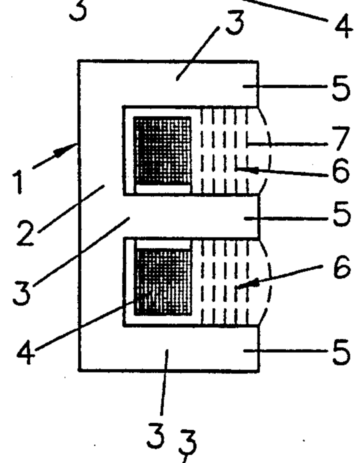
Fig. 2
Fig. 3a
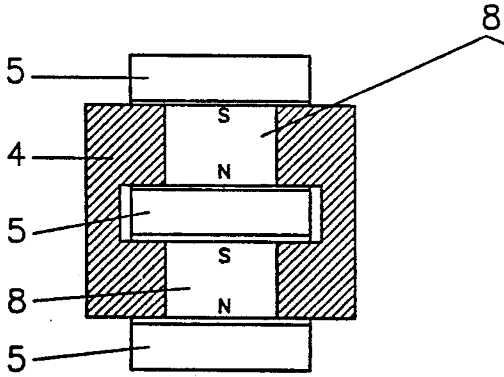
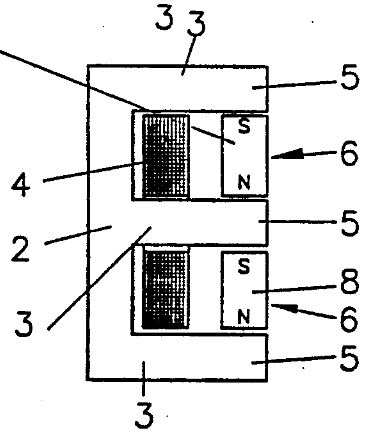
Fig. 3
Fig. 4a
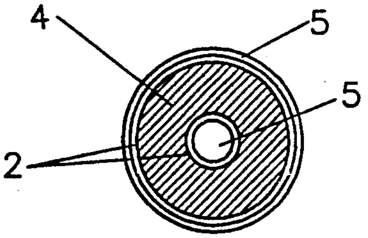
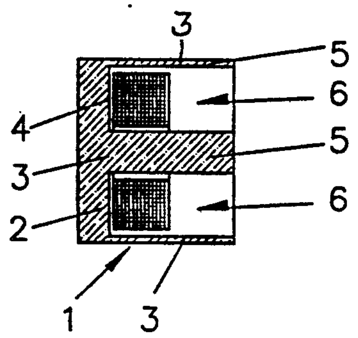
Fig. 4

Fig. 5a
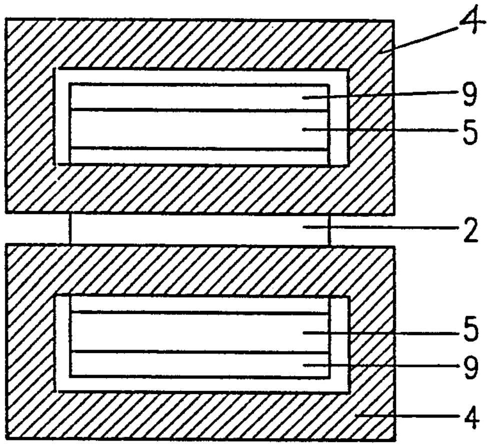
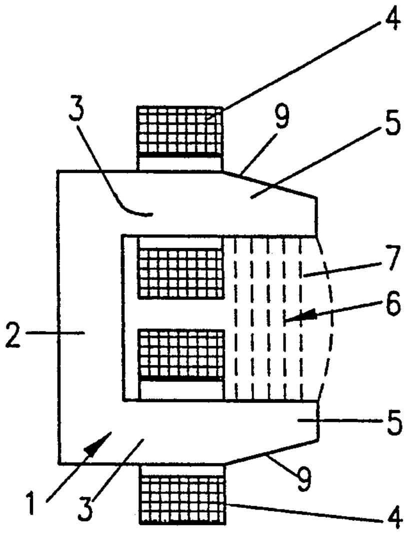
Fig. 5
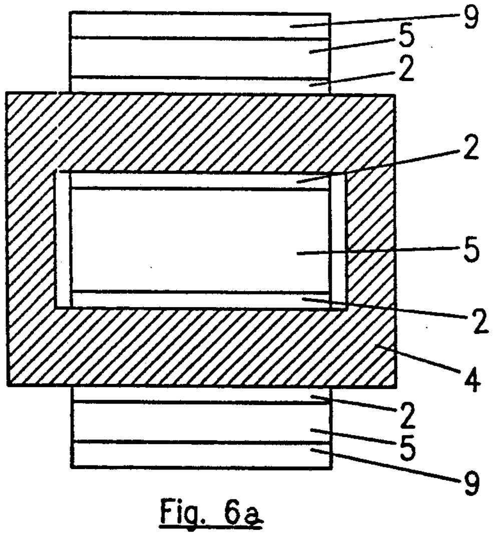
Fig. 6a
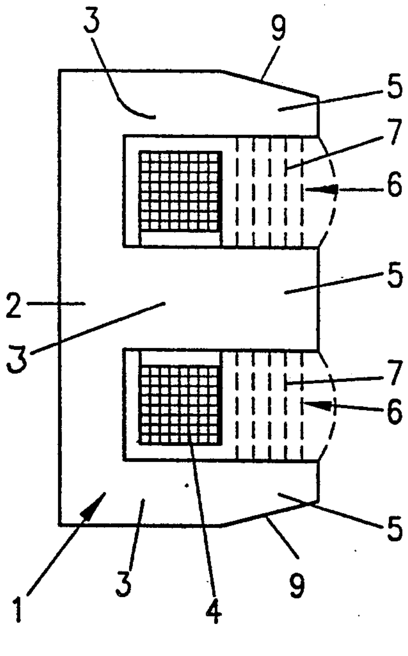
Fig. 6

SWITCHING MODE POWER TRANSFORMER

The invention relates to a switching mode power transformer for operation as a feedback converter, in which in order to avoid saturation of the magnetic core material the magnetic circuit has at least one air gap, the core having a base part and core parts projecting from the base part alongside each other with a spacing between them, and the windings are arranged on at least one bobbin and are slipped onto a projecting core part.

Switching mode power transformers of this type are operated in a frequency range up to 500 kHz and always require an air gap in the magnetic circuit to ensure that saturation of the magnetic core material is avoided.

In conventional switching mode power transformers the cores are designed in two parts so as to make it possible for the coils, which have previously been produced separately with one or more windings on one bobbin or coil former, to be slipped onto the projecting core parts. The second core part then serves to complete the magnetic circuit. In this respect the cores may be double U, double E, EI, EC and ETD and similar forms of core. At any event the required air gap is established between the adjacent faces of the pairs of cores, realized for instance by insertion of suitable spacers or by making at least one projecting core part shorter than the others.

Conventional switching mode power transformers have the disadvantage that the cores need complex and therefore expensive processing. Furthermore the two parts of a pair of cores have to be connected to each other by clamps or by bonding, this again being a complex working step.

One object of the invention is to devise a switching mode power transformer of the initially mentioned type which involves neither elaborate processing of the core nor means for fitting and holding together the core parts. This object is achieved in accordance with the invention inasmuch as the core parts projecting from the base part are extended substantially past the breadth of the winding in order to form an air gap which is in each case present between their free end sections and clear of the windings.

Owing to the fact that in the switching mode power transformer in accordance with the invention the free space between two adjacent projecting core parts simultaneously functions as an air gap, there is no longer the necessity to have a second core part to complete the magnetic circuit after slipping the coil or coils onto one respective projecting core part and there is no longer any necessity for elaborate and expensive processing for finishing and assembling the core as in the prior art. As compared with the prior art, the switching mode power transformer of the invention has the following advantages:

(1) for the magnetic circuit only a single integral core is required.

(2) no elaborate grinding operations are required.

(3) the air gap is clear of the coil or windings so that the influence of the leakage field on the winding is reduced (and thus there are lower eddy current losses).

(4) magnetic tolerances are reduced.

(5) the transformer may readily be so arranged that the leakage magnetic field only extends in the board and not upwards into the picture tube, this being extremely important in television receivers and monitors.

In the case of the switching mode power transformer of the invention it is possible in a particularly simple manner for the desired premagnetization to be produced if in accordance with claim 2 a permanent magnet is placed in the air gap between adjacent end sections of the projecting core parts or, in the case of a core with a middle projecting core part placed between outer projecting core parts, a permanent magnet is placed in front of the free end of the latter. The premagnetization of the core makes it possible, as is well known, to convert a higher power in feedback converter operation. The premagnetization as indicated in claim 3 with a permanent magnet placed in front of the free end of a middle projecting core part, leads to the further advantage that the permanent magnet is not demagnetized if a short circuit should occur.

The surfaces on opposite sides of the air gap, of the free end sections of the projecting core parts are preferably made plane-parallel to each other.

It has been discovered that by chamfering the outer surfaces of the core legs, there is a reduction of the external leakage magnetic field. Furthermore there is a saving in the weight of the core and thus production is possible at a lower price and the core with oblique projecting core parts, for instance core limbs, is better able to withstand acceleration owing to the reduced mass (that is to say there is a reduced chance of fracture).

The core may be formed as a U, E or bell core.

The projecting core parts are so far extended outside the actual coil or coils and are so dimensioned that the magnetic resistance of their oppositely placed end sections is approximately equal to the magnetic resistance of the air gap between same.

Embodiment of the switching mode power transformer in accordance with the invention are to be seen in the diagrammatic drawings.

FIGS. 1 to 4 each show on the left in the figures labelled with an "a" suffix a view from the front looking towards the free ends of the projecting core parts and on the right a side view with a coil arrangement sectioned parallel to the plane of the drawing to show four different designs, the design of FIG. 3 involving premagnetization.

FIG. 5 and FIG. 6 show—in the same general representation as in FIGS. 1 to 4—two further possible embodiment of the invention in which the outer projecting core parts are shaped so as to be chanfered on mutually remote sides and to have such chanfered outer faces converging towards their free ends with FIG. 5*a* and FIG. 6*a* being views looking at the free ends of the core parts, and FIGS. 5 and 6 being side elevations of FIG. 5*a* and FIG. 6*a* respectively.

FIG. 7 is an elevation of the design of FIG. 6 with a coil having two windings and with premagnetization by a permanent magnet, which is placed at the end in front of the free end of the middle of the three projecting core parts as provided in this form of the invention.

In the design of FIG. 1 the core 1 is a U core which on its two core parts 3 (which here form limbs) projecting from the base part 2, bears coils 4 with the required windings, which are each slipped on as far as a position near the base part 2. The projecting core parts 3 are substantially extended past the breadth of the respective coils 4 and the windings thereof and their extended end sections 5 define an air gap 6 between them which is needed in a switching mode line transformer in order to avoid saturation of the core material. It is via the air gap 6 that the magnetic circuit is completed clear of the coils 4. The magnetic field lines are marked in broken lines and referenced 7.

The design of FIG. 2 differs from that of FIG. 1 since the core in this case is an E core, only one coils 4 with the required windings is provided which is slipped on the middle projecting core part 3 and there are two air gaps 6 between the middle projecting core part 3 and the two outer projecting core parts 3. The design of FIG. 3 is the same as that of FIG. 2 with the difference that a respective permanent magnet 8 is arranged in the two air gaps 6. The two permanent magnets 8 cause a premagnetization of the magnetic material of the core 1.

In the embodiment of FIG. 4 the core 1 is a pot core. In the case of such a core the core parts 3 projecting from the disk-like base part 2 consist of a middle cylindrical part and an outer cylindrical part surrounding the latter with a clearance coaxially. The air gap 6 in this case extends between the free end section 5 of the central middle projecting core part 3 and the free end section 5 of the cylindrical outer projecting core part 3.

The design of FIG. 5 is similar to that of FIG. 1 and the design of FIG. 6 is similar to that of FIG. 2 with the difference in each case that here the free end sections 5 of the respective outer projecting core parts 3 are chanfered on their mutually remote sides, the respective chanfered surfaces 9 converging towards each other as they extend from the coil arrangement.

The design in accordance with FIG. 7 differs from that of FIG. 6 inasmuch as a permanent magnet 8 is arranged in front of the free end face of the middle projecting core part 3. This permanent magnet premagnetizes the core 1. The coils 4 bear two windings W1 and W2 in this case.

We claim:

1. A switching mode power transformer having a core with a base part and core parts projecting from the base part parallel to each other with a spacing therebetween, and windings arranged on at least one bobbin slipped onto one of said projecting core parts characterized in that the projecting core parts (3) have spaced parallel faces therebetween throughout their length and are substantially extended past the windings (4) so that their free end sections (5) respectively define between them an air gap (6) clear of the windings, and said free end sections of said core parts on each side of said one core part are chamfered on their mutually remote sides to form outer surfaces converging towards each other, whereby there is a reduction of the external leakage magnetic field and saturation of the core material is avoided.

2. The switching mode power transformer as claimed in claim 1, characterized in that the projecting core parts (3) are so far extended clear of the windings (4) and are so dimensioned that the magnetic resistance of their end respectively opposite end sections (5) is generally equal to the magnetic resistance of the air gaps (6) between them.

3. A switching mode power transformer as claimed in claim 1, characterized in that the core (1) is an E core.

* * * * *